Feb. 8, 1927. 1,617,099
T. BOVEY ET AL
CONTROL FOR AUTOMOBILE HEATERS
Filed Oct. 27, 1926 2 Sheets-Sheet 1

Inventor:
Sidney J.V. Bovey,
& Thomas Bovey
By Thomason & Landy
Attys

Feb. 8, 1927.
T. BOVEY ET AL
1,617,099
CONTROL FOR AUTOMOBILE HEATERS
Filed Oct. 27, 1926  2 Sheets-Sheet 2
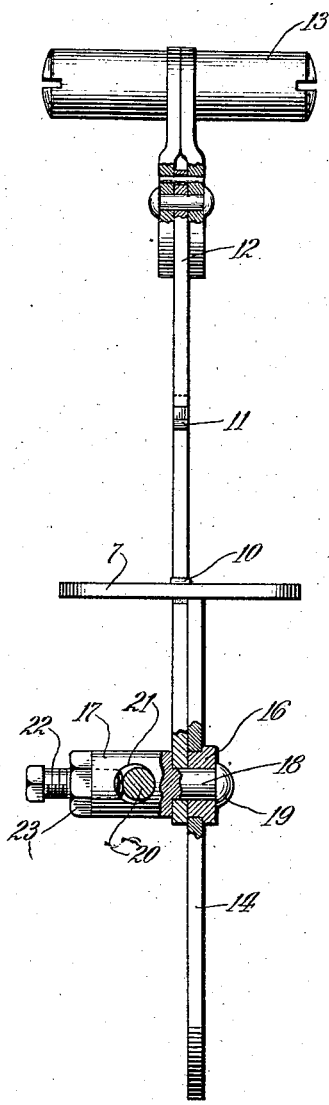
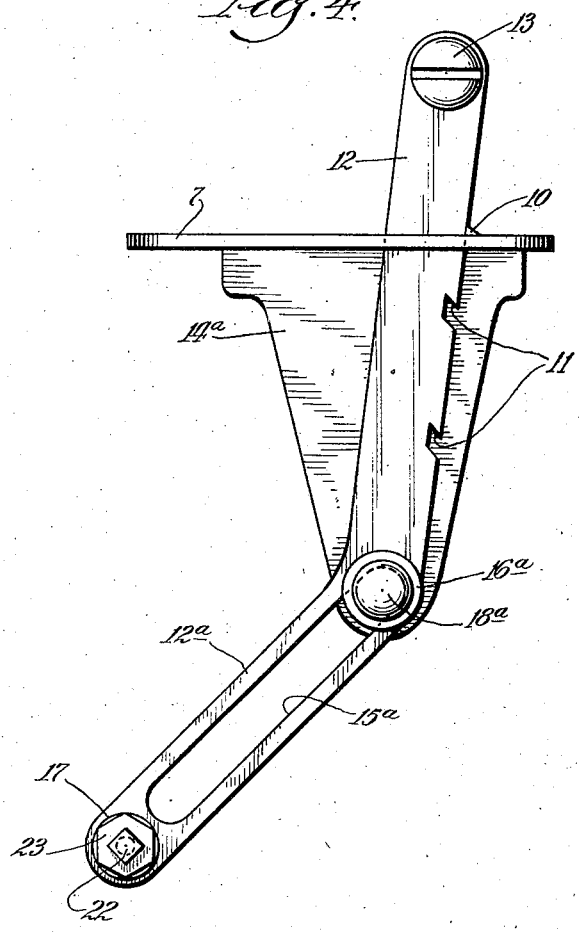

Patented Feb. 8, 1927.

1,617,099

UNITED STATES PATENT OFFICE.

THOMAS BOVEY AND SIDNEY J. V. BOVEY, OF CHICAGO, ILLINOIS; SAID SIDNEY J. V. BOVEY ASSIGNOR TO SAID THOMAS BOVEY.

CONTROL FOR AUTOMOBILE HEATERS.

Application filed October 27, 1926. Serial No. 144,613.

The present invention relates to means for operating a control valve of an automobile heater, and it has more particular reference to a suitably operated lever that is positioned in the floor of the vehicle and connected to the arm of the valve so that by a simple operation of the lever the valve is adapted to be opened or closed to admit or cut off the hot gas to or from the heater within the vehicle.

One of the objects of the present invention relates to providing a control device that is of extremely simple construction, so that it may be readily installed in the vehicle by unskilled persons, and is provided with effective means that are adapted to give the structure an initial movement with sufficient force to break away carbon that may have accumulated above the valve plate and valve seat. Other objects are to provide a control device that is made from a minimum of parts is dependable and effective in its operation and will not readily get out of order, and which is novel in construction.

We prefer to carry out this invention and accomplish the several objects thereof in substantially the manner hereinafter fully described and as more particularly pointed out in the claims, reference being herein made to the accompanying drawings that form a part of this specification.

In the drawings:

Figure 3, is a vertical edge view of the detached device in the position shown in Figure 1, and a portion thereof being broken away for clearness.

Figure 4, is a view similar to Figure 2 showing a modified form, in which the device may be made.

The drawings are schematic for the purpose of illustrating typical or preferred forms of this invention, and in said drawings similar reference characters have been employed to designate the same parts throughout the several views.

Figure 1:
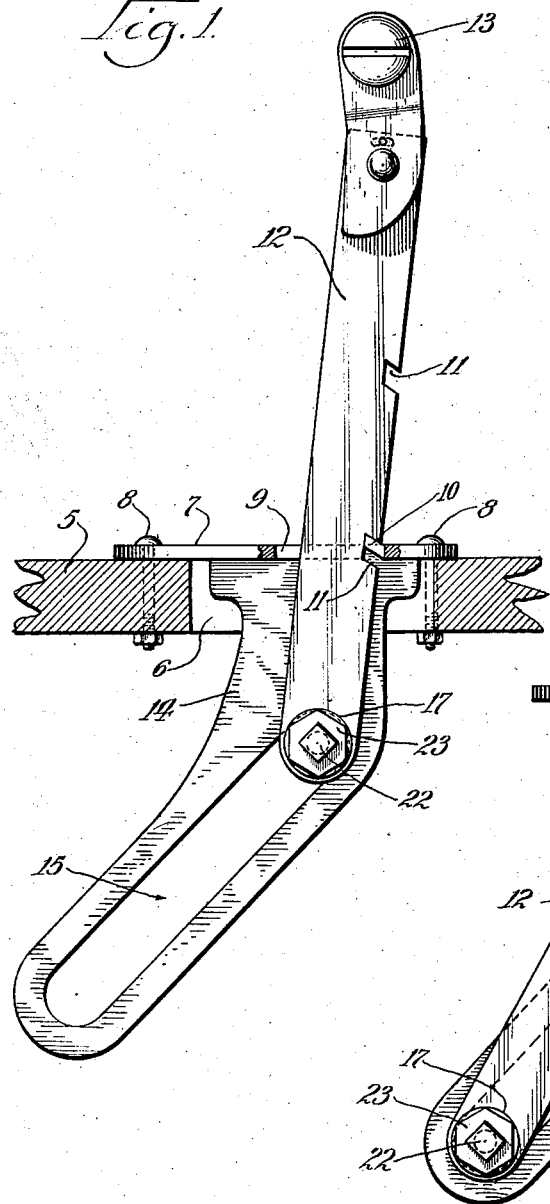
Figure 1, is a vertical side elevation of the improved control device showing the same mounted in the floor of the automobile, the operating lever being in a raised position to maintain the valve opened.

The floor or floor-board 5 of the vehicle is provided with a suitably shaped opening 6 into and through which the lower portion of the device is inserted and the base or floor-plate 7 of the device is placed flat upon the floor and secured in position by means of bolts 8 that pass through the plate and the floor. The base plate 7 is preferably flat and of any desired shape and it is provided with an elongated longitudinal slot 9, one end edge of which is upset as at 10 to provide a lip to be engaged by the serrations 11, in the adjacent longitudinal edge of the hand or operating lever 12. The hand lever consists of an elongated bar, and at the upper end of the lever there is provided a cross piece 13 to afford a ready grasp and the lower portion of said lever passes through the slot 9 in the base plate and is adapted to be reciprocated therein to operate the valve.

Figure 2:
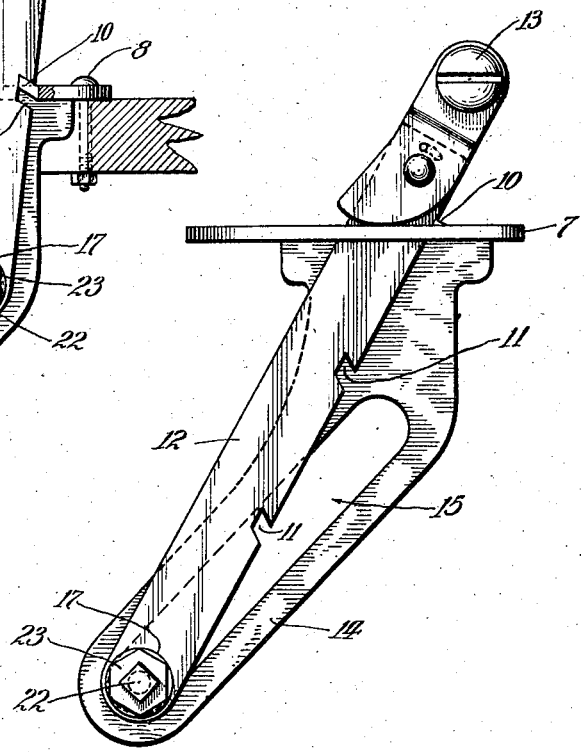
Figure 2, is a vertical side elevation of the structure removed from the floor with the lever shown in a lowered position to maintain the valve closed.

Depending from the under surface of base-plate 7 is a vertical bracket element 14, that extends laterally therefrom through the opening 6 in the floor board and projects below the same a suitable distance and the lower portion of this bracket 14 is provided with an oblique slot 15 that inclines upwardly toward the base-plate of the device. The lower end of the lever 12 is guided in its operating movement by means of a lateral element that projects from the lower end of the lever and engages in the slot 15. In the type shown in Figures 1, 2, and 3 of the drawings there is provided in a flanged roller 16 the slot-engaging portion of which is of a diameter to permit it to travel easily in the slot 15 and said roller is maintained on the lower end of lever 12 in the following manner. A cylindrical swivel block 17 is provided that has its axis disposed transverse to the plane of the lever and one end of the block is reduced in diameter to provide a spindle 18 that is inserted through a hole in the lower end of the lever 12, and through the bore of the roller 16 where its end is headed over as at 19. The assembly of the swivel block with the lever and the roller is such that the block may be rotated upon its axis and the roller may rotate by contact with the side of the slot 15 and said block also provides means for assembling the lever with the adjacent end of the rod 20 that is connected to the valve arm. The adjacent end of the rod 20 is inserted in a transaxial bore 21 made in the block 17 and is held in position therein by a clamping bolt 22, screwed into a threaded axial bore in the outer end of the block, which bolt is locked into position by a locknut 23. When the lever 12 is moved upwardly by the operator to the position shown in Figure 1, the lower end of said lever will have traveled the length of the slot 15 in the depending bracket and such movement will be sufficient to operate the valve arm to open the valve. When in the position shown in Figure 1, the lower serration 11 of the lever is engaged with the lip 10, so that the structure is supported in its adjusted position. By lowering the lever until the other serration 11 engages the lip 10 the valve will be only partly closed, or by moving the lever down to its lowermost position as shown in Figure 2 the valve will be entirely closed.

In the form of the invention shown in Figure 4 the base plate 7 is provided with a depending unslotted bracket element 14$^a$ and the lever is of irregular or bellcrank shape by providing an oblique extension 12$^a$ that has an elongated slot 15$^a$ therein corresponding with the slot 15 of the bracket in the first-described form. At the lower end of the bracket 14$^a$ is mounted the flanged roller 16$^a$ upon a headed spindle 18$^a$, which roller engages in the slot 15$^a$ and guides the lever in its movement. The lower end of the oblique extension 12$^a$ has the swivel block 17 mounted thereon with its rod clamping bolt 22 and the lock nut 24. In this construction, when the lever is moved upwardly or downwardly the lower end of its oblique portion 12$^a$ will be moved back and forth from its initial position a distance sufficient to reciprocate the rod 20 to open or close the valve.

It will be noted that in both types disclosed herein the lever is moved upwardly and downwardly to operate the valve and said lever is guided in these movements by a pin and slot connection between the bracket element and the portion of the lever below the floor or base plate, and as the slot in each instance is inclined or oblique the lower end of the lever, besides moving upwards or downwardly, also moves in a horizontal direction, which causes a pull or push upon the rod that connects with the valve arm. In addition to the longitudinal movement of the lever there is also an oscillatory movement thereof due to its engagement with the slot or aperture in the base-plate.

Frequently, where a heater has not been opened for a period of time there is an accumulation of carbon about the valve plate and valve seat so that it is sometimes difficult to break away this deposit and there has been provided a cam on the operating lever that permits the operator to make an initial movement of the control device. In order to assist the operator in making this initial movement of the valve, the upper end of lever 12, where it passes through the floor plate 7 is provided with a cam structure or second-class lever in the form of an extension 24 the lower end of which is bifurcated to provide spaced members 25, that straddle the upper end of the lever 12 and pivotally connected thereto by a transverse pintle 26. The portion of the extension 24 adjacent the floor plate is provided with an oblique edge 27 so that when the hand grasp 13 is being raised the lower tapered corner 28 will contact the floor plate thus creating additional power due to the initially increased leverage. This is sufficient to impart a movement to the control device and an initial movement to the valve plate that will be ample to break away the carbon and permit the operator to pull the lever 12 upwardly as far as desired. A pin 29 passes through the bifurcated or spaced members 25 and operates in a segmental slot 30 in the adjacent portion of the lever 12 to prevent movement thereof too far in either direction.

What is claimed as new is:—

1. A control device comprising a base plate provided with an aperture, a bracket extending transversely from said plate, a bar reciprocable longitudinally in said aperture, and a pin and slot connection between said bar and bracket whereby a longitudinal movement of said bar will cause the same to oscillate in a transverse direction at its ends.

2. A control device comprising a base plate, a bracket extending transversely from said plate, an elongated reciprocable bar coacting with said plate, and said bar and said bracket provided with co-acting pin and slot elements to provide connection between said bar and bracket whereby a longitudinal movement of said bar will cause the same to oscillate transversely at its lower end.

3. A control device comprising a base plate, a bracket extending transversely from said plate, an elongated bar having a sliding connection with said plate and having a portion disposed alongside said bracket, and a pin and slot connection between said bar and bracket whereby a longitudinal movement of the bar with respect to the plate will cause a portion of said bar to oscillate transversely.

4. A control device comprising a base plate, a bracket extending transversely from said plate and provided with a guide slot, an elongated reciprocable bar coacting with said plate, and a lateral member projecting from said bar and engaging said slot whereby a longitudinal movement of said bar will oscillate the same transversely at its lower end.

5. A control device comprising a base plate provided with an aperture, a bracket extending transversely from said plate and provided with an oblique guide slot, a bar reciprocable transversely through the aperture on said plate, and a lateral member projecting from said bar and engaging said slot whereby a longitudinal movement of said bar will oscillate the same at its lower end.

6. A control device comprising a base plate provided with an aperture and adapted to be secured horizontally upon the floor of an automobile, a bracket depending vertically from said plate and provided with an oblique guide slot, an elongated flat bar reciprocable vertically in said aperture, and a roller rotatably mounted upon the lower portion of said bar and engaged in said guide slot, whereby said bar is guided and transversely oscillated during its reciprocable movement.

7. A control device comprising a baseplate provided with an aperture, a bracket extending transversely from said plate, a bar reciprocable longitudinally in said aperture, means operatively connected to said bar whereby the operation of said means in one direction imparts an initial movement to said bar and the further movement of said means in another direction continues to move said bar, and a pin and slot connection between said bar and bracket.

8. A control device comprising a base plate, a bracket extending from said plate, an elongated reciprocable bar coacting with said plate, means operatively connected to said bar whereby the operation of said means in one direction imparts an initial movement to said bar and the further movement of said means in another direction continues to move said bar, and a pin and slot connection between said bar and bracket.

9. A control device comprising a base plate, a bracket extending transversely from said plate, an elongated bar having a sliding connection with said plate and having a portion disposed alongside said bracket, means operatively connected to said bar whereby the operation of said means in one direction imparts an initial movement to said bar and the further movement of said means in another direction continues to move said bar, and a pin and slot connection between said bar and bracket.

10. A control device comprising a base plate, a bracket extending therefrom provided with a guide slot, an elongated reciprocable bar coacting with said plate, a lateral member projecting from said bar and engaging said slot, and means operatively connected to said bar whereby the operation of said means in one direction imparts an initial movement to said bar and the further movement of said means in another direction continues to move said bar.

11. A control device comprising a base plate, a bracket extending therefrom provided with a guide slot, an elongated reciprocable bar coacting with said plate, a lateral member projecting from said bar and engaging said slot, and a second class lever pivotally connected to said bar above said plate whereby to impart an initial movement to said bar and the bodily movement of said lever further moves said bar.

12. A control device comprising a base plate, a bracket extending therefrom provided with a guide slot, an elongated reciprocable bar coacting with said plate, a lateral member projecting from said bar and engaging said slot, and a cam pivotally connected to said bar and adapted to engage said base plate to initially move said bar and the bodily movement of said cam further moves said bar.

Signed at Chicago, in the county of Cook, and State of Illinois, this 14th day of October, 1926.

THOMAS BOVEY.
SIDNEY J. V. BOVEY.